United States Patent [19]

Sebenik et al.

[11] Patent Number: 4,495,157

[45] Date of Patent: Jan. 22, 1985

[54] RECOVERY OF METAL VALUES FROM SPENT HYDRODESULFURIZATION CATALYSTS

[75] Inventors: Roger F. Sebenik; Pablo P. LaValle, both of Ann Arbor, Mich.; John M. Laferty, Wheat Ridge, Colo.; William A. May, Ann Arbor, Mich.

[73] Assignee: Amax Inc., Greenwich, Conn.

[21] Appl. No.: 528,884

[22] Filed: Sep. 2, 1983

[51] Int. Cl.³ .................. C01G 31/00; C01G 39/00
[52] U.S. Cl. ........................... 423/54; 423/55; 423/58; 423/61; 423/63; 423/65; 423/68; 423/138
[58] Field of Search .............. 423/53, 54, 58, 61, 423/63, 65, 66, 68

[56] References Cited

U.S. PATENT DOCUMENTS

| | | | |
|---|---|---|---|
| 2,187,750 | 1/1940 | Marvin | 423/53 |
| 3,773,890 | 11/1973 | Fox et al. | 423/58 |
| 4,075,277 | 2/1978 | Castagna et al. | 423/61 |
| 4,075,278 | 2/1978 | Gravey et al. | 423/61 |
| 4,087,510 | 5/1978 | Steenken | 423/61 |
| 4,145,397 | 3/1979 | Tioda et al. | 423/61 |
| 4,382,068 | 5/1983 | Rokukawa | 423/68 |

*Primary Examiner*—Herbert T. Carter

*Attorney, Agent, or Firm*—Michael A. Ciomek; Eugene J. Kalil

[57] ABSTRACT

A process is provided for recovering metal values from spent hydrodesulfurization catalyst, the process comprising forming in a pressure reactor an aqueous slurry of finely divided spent catalyst and sodium carbonate, the spent catalyst containing by weight about 2 to 10% Mo, up to about 12% V (e.g., about 2 to 10%), about 0.5 to 4% Co, up to about 10% Ni (e.g., about 0.5 to 5%), occluded oil, coke, sulfide sulfur and the balance essentially alumina. The amount of sodium carbonate employed is at least sufficient under oxidizing conditions to convert molybdenum and any vanadium present to soluble $Na_2MoO_4$ and $NaVO_3$ and to neutralize $SO_3$ produced during oxidation, the amount of sodium carbonate being at least that required stoichiometrically. The slurry is heated to a temperature of about 200° C. to 350° C. (e.g., 275° C. to 325° C.) and a pressure of about 800 psig to 2500 psig (e.g., about 1500 psig to 2500 psig) for a time at least sufficient to solubilize the molybdenum and vanadium present, the amount of oxygen employed being over about 1.1 times the stoichiometric amount sufficient to oxidize the metal values and sulfur to the maximum oxidized state, and to oxidize the oil and free carbon to $CO_2$ and $H_2O$. The solubilized Mo and V are thereafter separated from each other.

10 Claims, 3 Drawing Figures

4,495,157

RECOVERY OF METAL VALUES FROM SPENT HYDRODESULFURIZATION CATALYSTS

This invention relates to the recovery of metal values from spent catalysts and, in particular, to the recovery of such metal values as Mo, V, Ni, Co, etc., from spent catalysts resulting from the treatment of crude oil.

BACKGROUND OF THE INVENTION

Because the worldwide availability of sweet crude oil (i.e., low sulfur oil) is diminishing, the need to hydrodesulfurize sour crudes has increased the use of cobalt and molybdenum as catalysts for the removal of sulfur. Generally, alumina is used as a support or carrier for these catalysts. Coupled with the increased costs of disposal over the next decade, spent catalysts containing molybdenum and cobalt (which may also contain vanadium and nickel) provide a secondary source of metals.

A spent catalyst may contain, for instance, by weight 4% Mo, 8% V, 1% Co, 2% Ni, 10% oil, 10% coke, 10% sulfur and the balance alumina. The metal values in a spent catalyst may range by weight from about 2 to 10% Mo, 0 to about 12% V, about 0.5 to 4% Co, 0 to about 10% Ni, occluded oil, coke, sulfide sulfur, and the balance essentially alumina.

It would be desirable to provide an environmentally acceptable process for converting the sulfur and oil usually associated with the spent catalyst to $CO_2$ and $Na_2SO_4$, while recovering the metal values therefrom for recycle.

OBJECTS OF THE INVENTION

It is an object of the invention to provide a process for extracting and recovering metals values, such as Mo, V, Co, Ni, etc., from spent catalysts.

Other objects will clearly appear from the following disclosure, appended claims and the accompanying drawings, wherein:

SUMMARY OF THE INVENTION

According to one aspect of the invention, a process has been developed to recover metal values (e.g., Mo, V, Co and Ni) from spent hydrodesulfurization catalysts using wet-air oxidation (WAO) as an initial step to solubilize preferentially Mo and V. The sulfur, in addition, is converted to a soluble alkali metal sulfate, thereby avoiding environmental problems. The wet-air-oxidation process (either air or oxygen is used) is carried out under elevated temperature and superatmospheric pressure in a reactor, whereby oil and carbonaceous material (e.g., coke) are oxidized in the reactor to form $CO_2$ and $H_2O$, the sulfur oxidized to a soluble sulfate and the metal values Mo and V solubilized, with alumina, nickel and cobalt oxides reporting in the residue.

In summary, the process comprises forming in a reactor an aqueous slurry of finely divided spent catalyst and sodium carbonate, the spent catalyst containing by weight about 2 to 10% Mo, 0 to about 12% V, about 0.5 to 4% Co, 0 to about 10% of Ni, occluded oil, coke, sulfide sulfur and the balance essentially alumina. The amount of sodium carbonate employed is at least sufficient to convert the Mo and V to soluble $NaVO_3$ and $NaMoO_4$ and to neutralize the $SO_3$ produced during oxidation. The slurry is heated under oxidizing conditions to a temperature of about 200° C. to 350° C. under a pressure of about 800 psi to 2500 psi for a time at least sufficient to solubilize the Mo and V, the amount of oxygen being at least stoichiometrically sufficient to oxidize the metal values and sulfur to the maximum oxidized state and oxidize the oil and free carbon to $CO_2$ and $H_2O$. A lower range of pressure is employed where oxygen is used, and the high pressure range is employed where air is used as the oxidizing agent. The reacted slurry is removed from the reactor and the solids separated therefrom to provide a filtrate containing $NaVO_3$ and $Na_2MoO_4$, the solids containing alumina, NiO and CoO. Each of the metal values Mo and V is recovered from the filtrate, following which the metal values Ni and Co are recovered from solids.

DETAILS OF THE INVENTION

Experimental tests conducted on a spent catalyst obtained from a commercial hydrodesulfurizer demonstrated Mo recoveries of 98% and V recoveries of 89%. The spent catalyst prior to treatment contained by weight 15% oil, 6.3% S, 4% Mo, 8.4% V, 2.2% Co, 2.4% Ni, such residual elements as Pb, As, Ca, Fe, Zn (a total of up to about 3 to 5%) and the balance alumina. The tests showed that quantitative recoveries of Mo and V could be achieved by either sulfide precipitation or by solvent extraction.

The recovery of Ni and Co from the solids remaining following dissolution of Mo and V is easily achieved by the caustic digestion of alumina in the solids leaving Ni and Co as oxides in the residue. Caustic digestion dissolves up to about 95% of the alumina with substantially no dissolution of Ni and Co.

Figure 1:
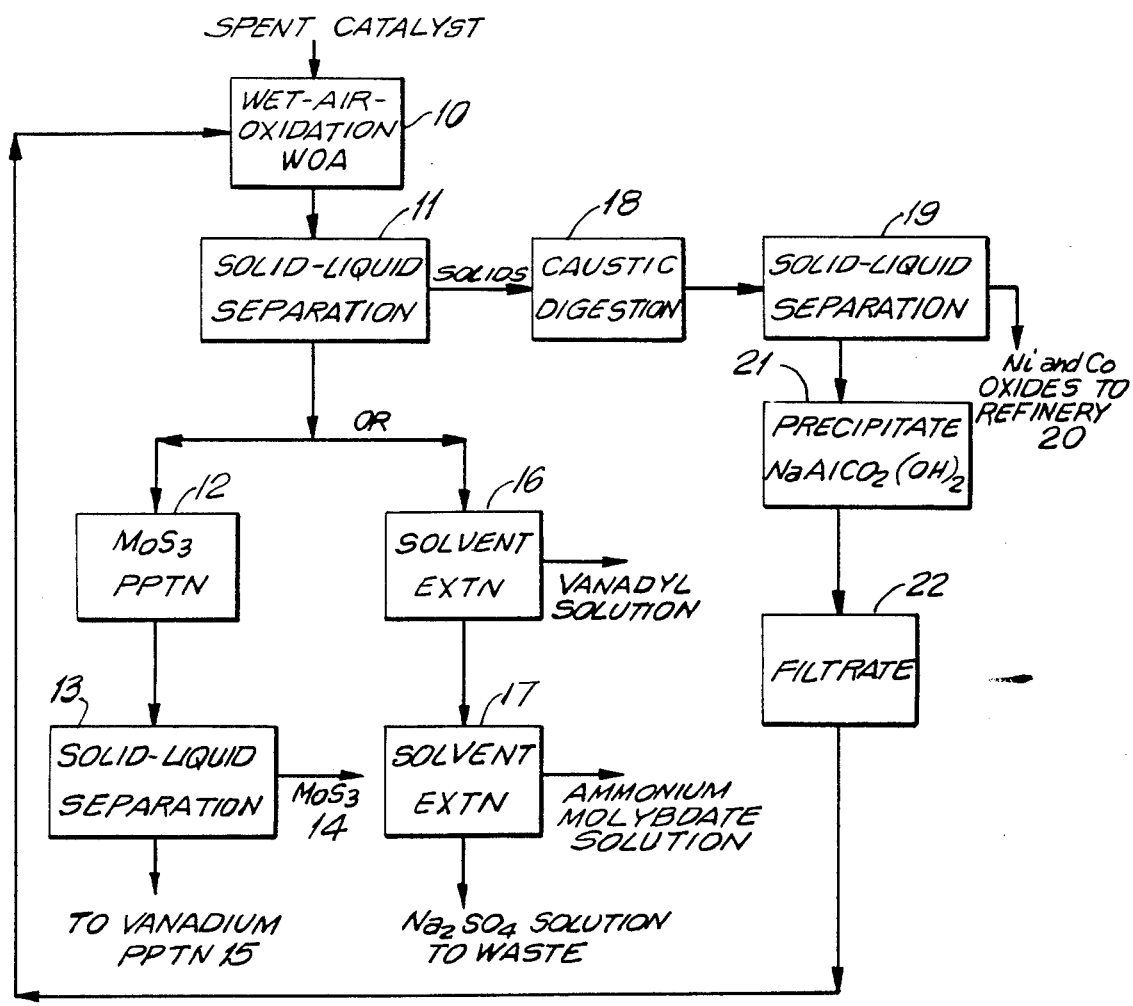
FIG. 1 is a flow sheet illustrating one embodiment of the invention.

Broadly speaking, the following steps may be employed in carrying out the invention (Note FIG. 1):

1. Wet-air-oxidation (WAO) of the spent catalyst at 10 to dissolve preferentially molybdenum and vanadium.
2. Separation of molybdenum and vanadium (11) as the WAO filtrate and isolation of pure molybdenum and vanadium products by either of the following techniques:
   (a) precipitation of $MoS_3$ (12) with $H_2S$ at low pH and subsequent precipitation of vanadium (15) after separation (13) of $MoS_3$ (14) by pH adjustment;
   (b) Recovery and separation of molybdenum and vanadium from the WAO solution by solvent extraction (16, 17).
3. Caustic digestion 18 of the WAO digestion residue to separate (19) and recover the nickel and cobalt as insoluble oxides 20.
4. Precipitation of $NaAlCO_2(OH)_2$ 21 from the caustic digestion filtrate with $CO_2$ to provide a final filtrate 22 for discard or recycle to 10 of FIG. 1.

A good part of the testing was carried out on a spent catalyst of high vanadium content. The spent catalyst, as stated hereinbefore, was an alumina-based catalyst containing by weight 4% Mo, 8.4% V, 2.2% Ni, 2.4% Co, primarily as sulfide (8.3% sulfur), 15% oil, 6.3% C, the balance being essentially alumina and residual elements.

The process is applicable, however, to spent catalysts containing by weight about 2 to 10% Mo, 0 to about 12% V (e.g., about 2% to 12%), about 0.5 to 4% Co, 0 to about 10% Ni (e.g., about 0.5 to 5%), occluded oil, carbonaceous material, such as coke, sulfide sulfur, and the balance essentially alumina and residual elements.

Details of each of the foregoing steps are given as follows:

I. WET-AIR-OXIDATION

The objective of the WAO step of the process is to oxidize molybdenum and vanadium values in the spent catalyst to obtain soluble molybdates and vanadates and to convert sulfide sulfur to sulfate and oil and carbon to $CO_2$ and $H_2O$. In the wet-air-oxidation (WAO) process, the as-received spent catalyst is mixed with $Na_2CO_3$ and slurried with water at 2500 psi and 300° to 320° C. to form soluble $NaVO_3$ and $Na_2MoO_4$, and to neutralize the $SO_3$ produced during the oxidation. The stoichiometric amount of oxygen is estimated by calculating the oxygen required to oxidize all the metal values and sulfur to their maximum oxidation state and to burn the oil and free carbon to $CO_2$ and $H_2O$. The stoichiometric amount of $Na_2CO_3$ is estimated by calculating the amount of sodium required to form the soluble $Na_2MoO_4$, $NaVO_3$ and $Na_2SO_4$. WAO avoids air pollution problems caused by roasting the spent catalyst in air. Another advantage of the WAO method is that the heat generated by oxidation of the metals, carbon, sulfur and oil contained in the catalyst provides an autogenous process.

Experimental Procedure

Figure 2:
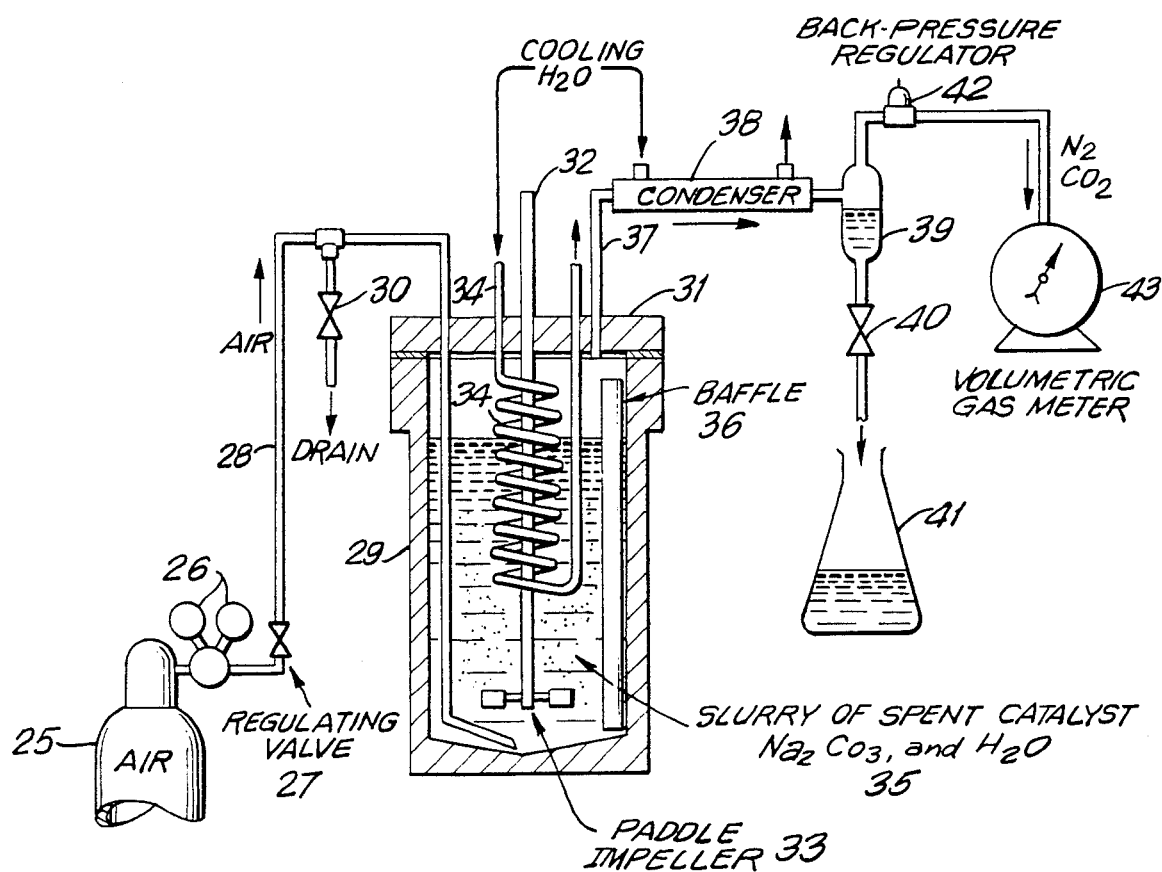
FIG. 2 shows schematically apparatus which may be employed in carrying out the invention.

The wet-air-oxidation tests were made batchwise with an air flow-through system in a 300 cc or a 1 gal. autoclave. The autoclaves were equipped with a variable-speed paddle impeller, vertical baffles, an external heating mantle, and an internal cooling coil. A schematic of the 1 gal. autoclave is shown in FIG. 2.

Referring to the accompanying drawing, compressed air from tank 25 is passed through pressure regulator 26 and flow regulating valve 27 through air line 28 to autoclave 29, a drain valve 30 being coupled to line 28 as shown.

Autoclave 29 has a cover 31 which is sealed during the run, the autoclave having a shaft 32 supported therein with an impeller 33 at its end. The shaft is surrounded by cooling coil 34 to control the temperature of the contents, i.e., the slurry 35 comprising spent catalyst, $Na_2CO_3$ and water. A baffle 36 is disposed along the inner wall of the autoclave.

Gases formed during the reaction are passed via line 37 to water-cooled condensers 38 as shown and moisture condensed and removed via trap 39 through valve 40 to receiver 41. The noncondensable gases $N_2$, $CO_2$, etc., pass through valve regulator 42 to volumetric gas meter 43.

The WAO tests were performed using the following procedure: a pre-mixed slurry of water, $Na_2CO_3$ and spent catalyst was loaded into the autoclave; the vessel was sealed; the impeller speed set to the desired value and the heater turned on. When the predetermined temperature was reached, air flow through the reactor was begun and continued for the predetermined time. The air flow rate was fixed by the total time of the reaction and the desired stoichiometry of the air with respect to the oxidation reaction. The air flow rate was measured and set by collecting the noncondensable gases leaving the reactor. At the prescribed time, the air flow was shut off and the vessel was sealed and cooled. The products of the reaction were then discharged and filtered.

Tests were conducted on a spent catalyst of the composition as shown in Table 2 below.

TABLE 2

| Ingredients | % in Spent Catalyst |
|---|---|
| oil | 15 |
| C | 6.3 |
| S | 8.3 |
| Mo | 4.0 |
| V | 8.4 |
| Co | 2.2 |
| Ni | 2.4 |
| As | 0.1–0.5 |
| Fe | 1–2 |
| Zn | 0.1–0.5 |
| $Al_2O_3$ | Balance |

The following variables (Note Table 3) at the values shown were tested, in a statistically designed series of experiments, in order to determine their effects on the solubilization of Mo and V.

TABLE 3

| Variable | High Level | Low Level |
|---|---|---|
| Amount of Air, x Stoichiometric | 2.5 | 1.1 |
| Oil Content (wt. %) | 16.3% | 0.5% |
| Slurry Density | 15% | 5% |
| $Na_2CO_3$ Stoichiometry | 1.1X | 0.5X |
| Temperature | 280 C. | 220 C. |
| Particle Size (<45 microns) | 49% | 97.6% |
| Total Pressure | 2500 psi | 1700 psi |
| Stirrer | 2000 rpm | 1000 rpm |
| Reaction Time | 3 hours | 1 hour |

It was observed that of all the variables tested, in the range indicated, only $Na_2CO_3$ stoichiometry had a significant effect on molybdenum and vanadium solubilization. The results indicated that at least 1.0×stoichiometric $Na_2CO_3$ was necessary. The only other variable that showed a marginal effect was temperature, with some indication that higher temperature was preferred.

Therefore, the following 3 variables were tested to determine the significance of these variables on molybdenum and vanadium solubilization. Oxygen partial pressure was added to complete the statistical design.

TABLE 4

| Variable | High Level | Low Level |
|---|---|---|
| Oxygen Partial Pressure | 300 psi | 150 psi |
| $Na_2CO_3$ Stoichiometry | 1.5X | 1.1X |
| Temperatures | 280 C. | 220 C. |

The results of these tests showed that the solubilization of vanadium was affected by both the temperature and the $Na_2CO_3$ concentration, indicating that the higher values of both variables were preferred. Oxygen partial pressure had no significant effect on either molybdenum or vanadium solubilization. $Na_2CO_3$ between 1.1× and 1.5×stoichiometry, and temperatures between 220° C. and 280° C., had no significant effect on the solubilization of molybdenum.

The effects on metals solubilization of higher temperatures and the oil content originally in the catalyst were also studied in a statistically designed series of experiments. The levels of the variables tested were as follows:

TABLE 5

| Variable | High Level | Low Level |
| --- | --- | --- |
| Temperature | 300 C. | 250 C. |
| Oil Content | 15% | 0.5% |

The results from this set of tests showed that high temperatures had a positive effect on the dissolution of molybdenum, vanadium and aluminum, and a negative effect on the dissolution of nickel. Temperature had no effect on cobalt dissolution. The higher oil content of the spent catalyst had a positive effect on the dissolution of nickel and a negative effect on the dissolution of aluminum. It had no effect on the dissolution of molybdenum, vanadium or cobalt.

Other wet-air-oxidation tests were also made by using a batch "rocking" autoclave. These tests were designed to define the effect of temperature and particle size on the process. Three slurries of different particle size were evaluated.

The results showed that there was not a significant effect on the recovery of either molybdenum or vanadium by particle size or temperature above 300° C. However, the completion of the oxidation reaction is significantly increased when performed at 320° C. instead of 300° C. This was demonstrated by a decrease in chemical oxygen demand (COD) of the oxidized slurries. The COD of the slurries oxidized at 300° C. was about three times larger than those oxidized at 320° C. High recoveries of both molybdenum and vanadium were achieved in all the tests while no detectable amount of Ni or Co was dissolved.

II. SEPARATION OF MOLYBDENUM AND VANADIUM: PRECIPITATION OF MoS₃

This step of the process enables the separation of molybdenum from the molybdenum-rich and vanadium-rich WAO solution by addition of $H_2S$ at low pH in order to precipitate a pure $MoS_3$ product.

Experimental Procedure

The WAO solution was combined with a known amount of $H_2SO_4$ to obtain a desired acid concentration. The solution was then heated to 80° C. and sparged with $H_2S$ for 20 minutes. It was allowed to cool while a small flow of $H_2S$ was maintained. When cool, the solution was digested for 18 hours and filtered. The filter cake was rinsed with $H_2SO_4$ (1% solution saturated with $H_2S$).

Results

The results of the $MoS_3$ precipitation tests are summarized in Table 6. The optimum molybdenum and vanadium separation occurred at $H_2SO_4$ concentrations between 2 and 4 normal with 99.8% of the molybdenum reporting to the precipitate and 99.8% of the vanadium remaining in solution. Higher or lower $H_2SO_4$ normalities were less effective in accomplishing the separation of molybdenum and vanadium.

TABLE 6

Preferential Precipitation of $MoS_3$ from the Wet-Air-Oxidation Filtrate Containing Mo and V by Acidification with $H_2SO_4$ and $H_2S$ Treatment

| | Starting Solution | | | $H_2SO_4$ Addition | | $H_2S$ Addition | | | $MoS_3$ Precipitate | | | Filtrate | | |
| --- | --- | --- | --- | --- | --- | --- | --- | --- | --- | --- | --- | --- | --- | --- |
| Run No. | Mo (g/l) | V (g/l) | pH | Normality[1] | pH | Temp. (°C.) | Time (min) | Final pH | % Mo | % V | % Mo Recovered | V (g/l) | Mo (g/l) | % V In Solution |
| 1 | 4.7 | 7.5 | 8.9 | 2.2 | 0.4 | 80 | 20 | 0.7 | 25.9 | 0.28 | 99.6 | 7.5 | 0.020 | 99.3 |
| 2 | 4.7 | 7.5 | 8.9 | 4.2 | <0 | 80 | 20 | <0 | 27.4 | 0.18 | 99.8 | 7.5 | 0.011 | 99.6 |
| 3 | 7.9 | 12.9 | — | 2.0 | <0 | 80 | 20 | <0 | 27.3 | 0.10 | 99.7 | 11.4 | 0.03 | 99.7 |
| 3W[2] | | | | | | | | | | 0.03 | | | | |
| 4 | 7.9 | 12.9 | — | 4.0 | <0 | 80 | 20 | <0 | 26.0 | 0.06 | 99.7 | 11.4 | 0.033 | 99.8 |
| 4W[2] | | | | | | | | | | 0.04 | | | | |

[1]Normality is with respect to $H_2SO_4$.
[2]$MoS_3$ filter cake was reslurried in deionized water and reprecipitated.

III. SEPARATION OF MOLYBDENUM AND VANADIUM: RECOVERY OF VANADIUM AFTER MoS₃ PRECIPITATION

Following $MoS_3$ precipitation, vanadium remains in the solution as a vanadyl cation, $(VO)^{+2}$. The objective of this step of the process is to precipitate the vanadium as the hydrated oxide, $V(OH)_4.1.5H_2O$, by neutralization of the solution, or as red cake $(Na_2H_2V_6O_{17})$ by oxidizing the vanadium in solution with $NaClO_3$ and then adjusting the pH with NaOH or $Na_2CO_3$.

Experimental Procedures

The starting solution was prepared by precipitating $MoS_3$ from the WAO solution by the method described in Section II. The principal components of this solution were $Na_2SO_4$, $VOSO_4$ (vanadyl sulfate) and $H_2SO_4$. To precipitate the hydroxide of tetravalent vanadium, sufficient NaOH was added at room temperature to the starting solution to obtain a predetermined pH. The precipitate obtained was gelatinous, making it difficult to filter and wash away the $NaSO_4$ solution entrained in the filter cake.

To precipitate red cake, the starting solution was treated with $NaClO_3$ to oxidize the $(VO)^{+2}$. Then, NaOH was added to obtain a predetermined pH, the solution was boiled for 30 minutes, allowed to cool, and filtered. The filter cake was rinsed with deionized water.

The results of these tests are summarized in Table 7.

TABLE 7

Recovery of Vanadium From Vanadium-Containing Filtrate Following $MoS_3$ Precipitation

| | Starting Solution | | Neutralization | | | | | Precipitate | | | Filtrate | | |
| --- | --- | --- | --- | --- | --- | --- | --- | --- | --- | --- | --- | --- | --- |
| Run No. | V (g/l) | Mo (g/l) | $NaClO_3$ Oxidation | Starting pH | Final pH | Temp. (°C.) | Time (min.) | V (%) | Mo (%) | Na (%) | V (g/l) | Mo (g/l) | V Yield (%) |
| 1 | 11.4 | 0.193 | no | <0 | 7.0 | 25 | 5 | 7.0 | 0.3 | 25.2[1] | 0.18 | 0.11 | 96 |
| 2 | 11.6 | 0.036 | no | <0 | 6.0 | 25 | 5 | 32.3 | 0.1 | — | 0.03 | — | 99 |

TABLE 7-continued

Recovery of Vanadium From Vanadium-Containing Filtrate Following MoS₃ Precipitation

| Run No. | Starting Solution | | | Neutralization | | | | Precipitate | | | Filtrate | | V Yield (%) |
|---|---|---|---|---|---|---|---|---|---|---|---|---|---|
| | V (g/l) | Mo (g/l) | NaClO₃ Oxidation | Starting pH | Final pH | Temp. (°C.) | Time (min.) | V (%) | Mo (%) | Na (%) | V (g/l) | Mo (g/l) | |
| 4 | 12.9 | 0.024 | yes[2] | <0 | 2.5 | boiling | 30 | 47.3 | 0.1 | 6.4[2] | 0.15 | 0.01 | 99 |

[1]Filter cake very gelatinous, not washed.
[2]Filter cake washed.

Results

Both methods of precipitation gave up to 99% recovery of the vanadium from the starting solution. By neutralizing the starting solution to a pH of 6, a gelatinous precipitate was obtained containing 32.3% vanadium and 0.1% molybdenum impurity (0.3% on a metals only basis). By precipitating red cake, a similar vanadium recovery was obtained. This was accomplished by adjusting the pH to 2.5 after oxidizing the vanadium with NaClO₃. The precipitate contained 47.3% vanadium and 6.4% Na. These values are close to the stoichiometric values for a $Na_2H_2V_6O_{17}$ product (48.0% vanadium and 7.34% Na). The molybdenum impurity was 0.1% (0.2% on a metal only basis).

The molybdenum and Na impurities in the vanadium product are removed by redissolving the red cake in $Na_2CO_3$ and reprecipitating $NH_4VO_3$ with $H_2SO_4$ and $(NH_4)_2SO_4$. The $NH_4VO_3$ can then be calcined to obtain a pure $V_2O_5$ product.

IV. SEPARATION OF MOLYBDENUM AND VANADIUM BY SOLVENT EXTRACTION

Figure 3:
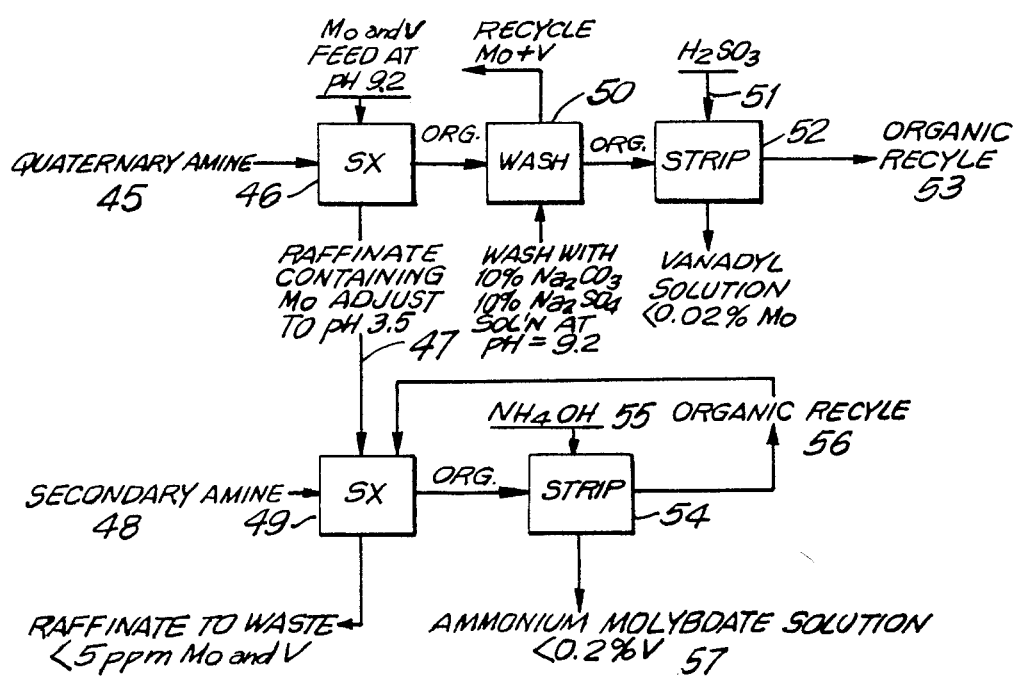
FIG. 3 is illustrative of a solvent extraction process for recovering Mo and V from pregnant liquor obtained in carrying out the invention.

An effective process was developed to separate molybdenum and vanadium by solvent extraction (See FIG. 3). The process involved extracting the vanadium with a quaternary amine 45 at SX 46. The raffinate 47 from vanadium extraction after pH adjustment was contacted with a secondary amine 48 for molybdenum extraction at SX 49. Vanadium was recovered after washing at 50 by stripping with sulfurous acid 51 ($H_2SO_3$) at stripper 52 to provide organic recycle. The molybdenum was recovered by stripping at 54 with ammonium hydroxide 55 ($NH_4OH$) with the organic 56 going to recycle. The molybdenum is recovered as an ammonium molybdate solution 57.

Experimental Procedure

Laboratory shakeout tests were done to simulate a continuous counter-current solvent extraction circuit. The results of 3-stage counter-current extraction of vanadium at pH=9.2 yielded a loaded organic containing 7.6 gpl vanadium and 0.25 gpl molybdenum. The final raffinate going to molybdenum recovery contained about 7.0 gpl molybdenum and 0.1 gpl vanadium. The solvent system for vanadium extraction was 10% Aliquat 336*, 60% n-decyl alcohol balance kerosene. Following extraction, the loaded organic was scrubbed in 2 stages with a solution containing 10 g $Na_2CO_3$, 10 g $Na_2SO_4$, 90 ml $H_2O$, and 3-5 ml $H_2SO_4$ to a pH 9.2. After scrubbing, the organic contained about 7.6 gpl vanadium and 0.016 gpl molybdenum. Stripping was now accomplished at a pH=0.5 with a 9% $SO_2$ solution at a 7.5 organic to aqueous ratio with two contacts, resulting in a vanadyl solution containing about 60 gpl vanadium and 0.1 gpl molybdenum.

* A tricapryl amine manufactured by Henkel.

The raffinate from the vanadium circuit was adjusted to pH=3.5 with $H_2SO_4$. This was contacted in the same fashion as above with a solvent system composed of 12.5% Adogen 283**, 12.5% 2, 6, 8 trimethyl-4 nonanol, 75% Escaid 200 (Exxon) at an organic to aqueous ratio of 1:2. Stripping was done with 10 M ammonium hydroxide to produce an ammonium molybdate solution from which ammonium dimolybdenum was crystallized.

** A ditridecyl amine manufactured by Sherex.

FIG. 3 is a schematic of the circuit as envisioned in continuous operation.

V. CAUSTIC DIGESTION OF THE ALUMINA

The purpose of this step of the process is to use caustic soda (NaOH) to selectively dissolve the alumina (catalyst support) from the WAO tails (composed of $\gamma$-$Al_2O_3$) and leave, as a solid residue, the insoluble oxides of Ni and Co.

Experimental Procedure

All digestion tests were performed in the autoclave shown in FIG. 2. The residue used for these tests was obtained by WAO of the spent catalyst (Table 3) at 300° C. and 2500 psi total pressure. The composition of a typical residue is shown in Table 8 as follows:

TABLE 8

Composition of the Residue Obtained From Wet-Air-Oxidation of the Spent Catalyst

| | |
|---|---|
| Ni | 3.06% |
| Co | 2.34% |
| V | 2.90% |
| Mo | 0.35% |
| Fe | 2.22% |
| Al | 31.4% |

The following procedure was used:

The autoclave was loaded with WAO residue and NaOH solution of the desired concentration. The vessel was then sealed and heated to the desired temperature. The slurry was stirred at temperature during the desired length of time at 1000 rpm. The vessel was then cooled to room temperature by means of the internal cooling coil 34, opened and drained. The slurry was filtered through a fiberglass filter on a Buchner funnel. The following variables were considered:

TABLE 9

| Variable | High Level | Low Level |
|---|---|---|
| Temperature of Digestion | 300 C. | 200 C. |
| NaOH Concentration (by weight) | 30% | 10% |
| Time of Digestion | 3 hours | 1 hour |

No dissolution of nickel was detected at any of the conditions tried. The sodium hydroxide concentration had the most significant effect on the dissolution of both alumina and cobalt. Alumina dissolution as high as 98% was obtained at 30% NaOH concentrations. However, at this high caustic concentration, considerable amounts of cobalt were also dissolved, ranging from 2.6 to 12%. At 10% caustic concentrations, no cobalt was detected in the solution. At this level of NaOH, the maximum solubilization of alumina was 95%. Temperature was also a significant factor in the solubilization of both aluminum and cobalt. In addition, the interaction between temperature and time have an effect in the dissolution of cobalt, i.e., at long times the temperature effect is maximized.

It is apparent that to maximize the solubilization of $Al_2O_3$ and to minimize the cobalt solubility, the digestion step should be performed at high temperatures with 20% NaOH concentration or less. With this NaOH concentration, only 0.35% of the cobalt was dissolved at 250° C.

Results

Alumina dissolutions of 95% were obtained with a 10% caustic solution at 250° C. without Ni or Co dissolution. These conditions yielded a solid residue that contained 7.0% Co, 8.3% Ni and 5.0% Al on a weighted basis. Higher alumina dissolutions were demonstrated, but some Co was also solubilized.

In summary, the invention is directed to a process for recovering metal values from spent hydrodesulfurization catalyst. The process comprises forming in a pressure reactor an aqueous slurry of finely divided spent catalyst and sodium carbonate, the spent catalyst containing by weight about 2 to 10% Mo, up to about 12% V (e.g., about 2 to 10%), about 0.5 to 4% Co, up to about 10% Ni (e.g., about 0.5 to 5%), occluded oil, coke, sulfide sulfur and the balance essentially alumina. The amount of sodium carbonate employed is at least sufficient to convert molybdenum and any vanadium present to soluble $Na_2MoO_4$ and $NaVO_3$ and to neutralize $SO_3$ produced during oxidation, the amount of sodium carbonate being at least that required stoichiometrically.

The slurry is heated under oxidizing conditions to a temperature of about 200° C. to 350° C. (e.g., 275° C. to 325° C.) and a pressure of about 800 psig to 2500 psig (e.g., about 1500 psig to 2500 psig) for a time at least sufficient to solubilize said molybdenum and vanadium present. The amount of oxygen should be over about 1.1 times the stoichiometric amount sufficient to oxidize the metal values and sulfur to the maximum oxidized state, and to oxidize the oil and free carbon to $CO_2$ and $H_2O$, the lower ranges of pressure being employed where oxygen is used and the higher pressure range being used when air is used as the oxidation agent. The reacted slurry is removed from the autoclave and the solids then separated therefrom to provide a filtrate containing $NaVO_3$ and $Na_2MoO_4$.

The solids contain alumina, NiO and CoO. Each of the metal values Mo and V is separated from the filtrate, and the metal values Ni and Co recovered from the solids.

The slurry density in the autoclave may range up to about 15% by weight and the amount of sodium carbonate may range from about 1.1 to 3 times the stoichiometric amount. Preferably, the amount of $Na_2CO_3$ ranges from about 1.5 to 3 times the stoichiometric amount.

The filtrate which contains $Na_2MoO_4$ and any $NaVO_3$ is subsequently treated to recover each of the metal values by selective precipitation or solvent extraction.

Molybdenum may be selectively precipitated from the solution as $MoS_3$ by adjusting the pH to less than about 1 and then adding $H_2S$ to the solution to provide a filtrate containing vanadium. The vanadium remaining in solution may then be precipitated as the hydrated oxide $V(OH)_4 \cdot 1.5 H_2O$ by neutralizing the solution with a neutralizing agent selected from the group consisting of NaOH and $NaCO_3$ or, in the alternative, precipitated as a red cake by first oxidizing the vanadium to its higher valance and then adjusting the pH thereof with the neutralizing agent, the pH ranging from about 1.5 to 3.0.

Alternatively, molybdenum and vanadium may be separated from each other and recovered by solvent extraction. Vanadium is first extracted with a quarternary amine at pH ranging from about 8.5 to about 9.5. Vanadium is stripped with a solution of about 9% $SO_2$.

Molybdenum is recovered by extraction with a secondary or tertiary amine at a pH ranging from about 2 to about 4. Molybdenum is stripped from the organic with a 10 M $NH_4OH$ solution.

The invention is particularly applicable to spent catalyst in which the vanadium ranges from about 2 to 10% and nickel ranging from about 0.5 to 10%, e.g., 0.5 to 5%.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process of recovering metal values from spent hydrodesulfurization catalyst which comprises:

forming in a pressure vessel an aqueous slurry of finely divided spent catalyst and sodium carbonate;

the spent catalyst containing by weight about 2 to 10% Mo, up to about 12% V, about 0.5 to 4% Co, up to about 10% Ni, occluded oil, coke, sulfide sulfur and the balance essentially alumina;

the amount of sodium carbonate being at least sufficient to convert Mo and any V present to soluble $Na_2MoO_4$ and $NaVO_3$ and to neutralize $SO_3$ produced during oxidation, the amount of sodium carbonate being at least that required stoichiometrically;

heating said slurry in the presence of an oxygen-containing gas to a temperature of about 200° C. to 350° C. and a pressure of about 800 psig to 2500 psig for a time at least sufficient to solubilize said Mo and any V present;

the amount of oxygen being over about 1.1 times the stoichiometric amount sufficient to oxidize the metal values and sulfur to the maximum oxidized state and oxidize the oil and free carbon to $CO_2$ and $H_2O$;

the lower range of pressure being employed where oxygen is used and the high pressure range being used when air is used as the oxidation agent;

removing the reacted slurry from the pressure vessel and separating the solids therefrom to provide a filtrate containing $NaVO_3$ and $Na_2MoO_4$ and solids containing alumina, NiO and CoO;

recovering each of the metal values Mo and V from the filtrate solution by selectively extracting said vanadium using an organic solvent containing a quaternary amine at a pH of about 8.5 to 9.5 and provide an aqueous raffinate containing said molybdenum which is extracted therefrom using an organic solvent containing a secondary or tertiary amine at a pH of about 2 to 4;

or, in the alternative, selectively precipitating said Mo value from the filtrate solution as $MoS_3$ by adjusting the pH to less than about 1 by the addition of $H_2S$ to provide a filtrate containing V which is recovered as a hydrated oxide by neutralizing the solution with a neutralizing agent selected from the group consisting of NaOH and $Na_2CO_3$ or precipitated as a red cake by first oxidizing the vanadium to its higher valance and then adjusting the pH thereof with said neutralizing agent.

2. The process of claim 1, wherein the nickel and cobalt values are separated from the solids by selectively dissolving the contained alumina with caustic soda.

3. The process of claim: 1, wherein the vanadium in the spent catalyst ranges from about 2 to 10% and the nickel ranges from about 0.5 to 5%.

4. The process of claim 1, wherein where the vanadium is extracted from the filtrate using said quaternary amine to provide a loaded organic containing said vanadium, the loaded organic is scrubbed with a solution containing $Na_2CO_3$ and $Na_2SO_4$ at a pH of about 8.5 to 9.5 to remove any co-extracted molybdenum present.

5. The process of claim 1, wherein where the molybdenum is recovered from the filtrate using an organic solvent containing a secondary or tertiary amine to provide a loaded organic containing said molybdenum, the molybdenum is thereafter stripped therefrom with an aqueous solution containing at least 10% $NH_3$.

6. A process of recovering metal values from spent hydrodesulfurization catalyst which comprises:

forming in a pressure vessel an aqueous slurry of finely divided spent catalyst and sodium carbonate;

the spent catalyst containing by weight about 2 to 10% Mo, about 2 to 12% V, about 0.5 to 4% Co, about 0.5 to 10% Ni, occluded oil, coke, sulfide sulfur and the balance essentially alumina;

the amount of sodium carbonate ranging from about 1.5 to 3.0 times stoichiometric sufficient to convert Mo and any V present to soluble $Na_2MoO_4$ and $NaVO_3$ and to neutralize $SO_3$ produced during oxidation;

heating said slurry in the presence of an oxygen-containing gas to a tamperature of about 275° C. to 325° C. and a pressure of about 800 psig to 2500 psig for a time at least sufficient to solubilize said Mo and any V present;

the amount of oxygen ranging from about 1.1 to 3.0 times the stoichiometric amount sufficient to oxidize the metal values and sulfur to the maximum oxidized state and oxidize the oil and free carbon to $CO_2$ to $H_2O$;

the lower range of pressure being employed where oxygen is used and the higher pressure range being used when air is used as the oxidation agent;

removing the reacted slurry from the autoclave and separating the solids therefrom to provide a filtrate containing $NaVO_3$ and $Na_2MoO_4$ and solids containing alumina, nickel and cobalt oxides, recovering each of the metal values Mo and V from the filtrate solution by selectively extracting said vanadium using an organic solvent containing a quaternary amine at a pH of about 8.5 to 9.5 and provide an aqueous raffinate containing said molybdenum which is extracted therefrom using an organic solvent containing a secondary or tertiary amine at a pH of about 2 to 4;

or in the alternative, selectively precipitating said Mo value from the filtrate solution as $MoS_3$ by adjusting the pH to less than about 1 by the addition of $H_2S$ to provide a filtrate containing V which is recovered as a hydrated oxide by neutralizing the solution with a neutralizing agent selected from the group consisting of NaOH and $Na_2CO_3$ or precipitated as a red cake by first oxidizing the vanadium to its higher valence and then adjusting the pH thereof with said neutralizing agent.

7. The process of claim 6, wherein the nickel and cobalt values are separated from the solids by selectively dissolving the contained alumina with caustic soda.

8. The process of claim 6, wherein the vanadium in the spent catalyst ranges from about 2 to 10% and the nickel ranges from about 0.5 to 5%.

9. The process of claim 6, wherein where the vanadium is extracted from the filtrate using a quaternary amine to provide a loaded organic containing said vanadium, the loaded organic is scrubbed with a solution containing $Na_2CO_3$ and $Na_2SO_4$ at a pH of about 8.5 to 9.5 to remove any co-extracted molybdenum present.

10. The process of claim 9, wherein the loaded organic is stripped with an aqueous solution containing in the range of about 7 to 10% $SO_2$ to recover vanadium.

* * * * *